No. 760,571.                                    Patented May 24, 1904.

UNITED STATES PATENT OFFICE.

WILHELM SCHWARZ, OF ZURICH, SWITZERLAND, ASSIGNOR, BY MESNE ASSIGNMENTS, TO SCHWARZ SYSTEM BRICK COMPANY, A CORPORATION OF NEW YORK.

PROCESS OF PRODUCING REFRACTORY CALCAREOUS SANDSTONES.

SPECIFICATION forming part of Letters Patent No. 760,571, dated May 24, 1904.

Application filed February 19, 1903. Serial No. 144,131. (No specimens.)

*To all whom it may concern:*

Be it known that I, WILHELM SCHWARZ, a citizen of the Republic of Switzerland, and a resident of Zurich, in the canton of Zurich and Republic of Switzerland, have invented a certain new and useful Process of Producing Refractory Calcareous Sandstones, of which the following is a full, clear, and exact specification.

This invention relates to the manufacture of calcareous sandstones; and its object is to render practicable the production of calcareous sandstones which shall be capable of effectually resisting the action of all acids and likewise the action of extremely high degrees of heat, such quality of heat and acid resistance being characterized by the term "refractory" as applied in metallurgy.

The invention consists in a novel mode of procedure whereby the attainment of the foregoing objects is rendered feasible, which mode of procedure will now be described and thereafter concisely set forth in the appended claims.

Calcareous sandstones are produced by combining chemically, or in a sense mechanically, a silicate, as sand, and lime or analogous product.

The resistance to heat of the calcareous sandstones made in the usual manner has hitherto been about equal to that of well-burnt clay bricks; but whether by steam-hardening or electrolytic hardening an absolute resistance to heat in the sense of the word "refractory" in metallurgy has never been attained in such calcareous sandstones.

The present invention relates to a process whereby a calcareous sandstone is made which is refractory to both heat and acids and may be used for the purpose to which Dinas bricks, porcelain clay, and magnesia bricks are now applied.

The process does not involve the addition of any chemical agent to the raw materials or the treatment of the finished stone with chemical preparations or solutions.

The reason why the ordinary artificial calcareous sandstones do not possess the aforesaid refractoriness is because they are made from quartz-sand without regard to the mineralogical composition thereof. Grains or crystals of quartz, however, frequently contain other minerals, organic constituents, such as salts, and likewise liquid carbonic acid, and these and analogous extraneous elements militate against absolute refractoriness of the calcareous sandstone.

When for the purpose of counteracting the effect of foreign substances or elements in the quartz-crystals the formed object is heated to a temperature near that at which quartz melts, the increase of volume produced by the change of the quartz from the crystalline to the amorphous state deforms the object, and this indeed frequently occurs in the sintering or other refractory stones manufactured from quartz and plastic binding materials if the mass be sharply heated after it has been fashioned.

In order to manufacture highly-refractory calcareous sandstone without involving a special chemical treatment and without distortion of the shape of the formed object, the following process is adopted according to this invention.

The quartz-sand with which is to be combined lime or an analogous product, slaked or unslaked, is first freed from all extraneous elements—such as other minerals, organic substances, water, liquid carbonic acid, iron combinations, and salts—by subjecting such quartz-sand separately to a high degree of heat, any approved apparatus or medium, including current electricity, if essential, being availed of for such purpose; but the degree of heat employed should not equal that required to melt the quartz.

To generate incandescent heat, current electricity is apparently most suitable, as there exists in the voltaic arc a reducing atmosphere which not only prevents the formation of silicate of iron, but insures a volatilization of the iron combinations of the quartz.

It is known that amorphous silica reacts more quickly and easily on basic substances than crystalline-quartz silica does. If, therefore, a sand subjected to this preliminary treatment is to be mixed with lime, it is necessary, if the raw material is to be rationally prepared, to add only the minimum proportion of lime to obtain in the presence of water an extremely active reaction with the silicic acid, and in consequence a very plastic mixture. The objects formed from such mixture when they shall have been hardened, whether electrolytically or by the aid of steam under pressure, as commonly practiced, possess a high quality of refractoriness by virtue of the small quantity of lime or analogous product comprised therein, the substantial volume of silicic acid present therein, and the absence therefrom of extraneous elements, such as frequently accompanies quartz-sand under natural conditions.

For the manufacture of the herein-described refractory calcareous sandstone quartz-sand possessing a very high percentage of soluble silicic acid may be advantageously used. Under such conditions and by reason of the celerity with which the silicic acid distributes itself through the lime availed of there is generated a silicate of calcium of pronounced acidity, which assures full resistance to the action of acids and to the action of a very high degree of heat on the part of the finished stone.

Having thus described my invention, what I claim, and desire to secure by Letters Patent, is—

1. The process of manufacturing refractory calcareous sandstones, which consists in first heating granulated quartz nearly to its melting-point, combining the same with lime, and then forming the combined lime and quartz into suitable shapes, substantially as described.

2. The process of manufacturing refractory, calcareous sandstone, which consists in first heating quartz-sand nearly to the melting-point to drive out impurities contained in the quartz-grains, combining the said pure quartz with lime, to form a plastic mass and molding the mass under pressure into the objects desired, substantially as described.

3. The process of manufacturing refractory, calcareous sandstone which consists in first heating quartz-sand by means of current electricity to a degree nearly sufficient to melt the quartz, combining the said purified sand with lime, and then forming the combined lime and quartz-sand into suitable shapes, substantially as described.

WILHELM SCHWARZ.

Witnesses:
   H. WETTSTEIN,
   A. LIEBERKNECHT.